United States Patent [19]
Tiao et al.

[11] Patent Number: 5,093,379
[45] Date of Patent: Mar. 3, 1992

[54] HEAT STABLE POLYURETHANE FOAMS

[75] Inventors: Chin-Sheng Tiao; Wen-Yu Tiao, both of Bethlehem, Pa.

[73] Assignee: Polymer Dynamics Technology, Inc., Allentown, Pa.

[21] Appl. No.: 506,227

[22] Filed: Apr. 9, 1990

[51] Int. Cl.$^5$ .............................................. C08G 18/14
[52] U.S. Cl. .................................. 521/129; 521/137; 36/114; 36/115
[58] Field of Search .................. 521/129, 137; 36/114, 36/115

[56] References Cited

U.S. PATENT DOCUMENTS

| | | | |
|---|---|---|---|
| 4,098,773 | 7/1978 | Illers et al. | 528/65 |
| 4,208,314 | 6/1980 | Priest et al. | 525/404 |
| 4,255,526 | 3/1981 | Yukuta et al. | 521/106 |
| 4,536,557 | 8/1985 | Heyman | 521/137 |
| 4,605,681 | 8/1986 | Grey et al. | 521/51 |
| 4,689,357 | 8/1987 | Hongu et al. | 521/137 |
| 4,698,410 | 10/1987 | Straehle et al. | 528/76 |

*Primary Examiner*—Maurice J. Welsh
*Attorney, Agent, or Firm*—David M. McConoughey

[57] ABSTRACT

Low density polyurethane foams having improved resistance to degradation of properties of compression set and flexibility when exposed to elevated temperatures and pressures are made by reacting a polyisocyanate of about 2.3 to 2.7 functionality at an isocyanate index of about 1.0 with a blend of polyols, catalysts, blowing agents and the like in which the polyols are a mixture of a polyether polyol having a molecular weight of at least 5,000 and a polymer polyol, and the catalysts are a mixture of a major portion of an amine catalyst and a minor portion of a metal catalyst. The foams made by this invention are particularly well suited for use as components of sport shoes that are asembled by vulcanization.

36 Claims, No Drawings

HEAT STABLE POLYURETHANE FOAMS

BACKGROUND OF THE INVENTION

1. Field of the invention.

This invention relates to low density polyurethane foams and, more particularly, this invention relates to molded foamed polyurethanes that are formulated to better retain certain of their physical properties after exposure to elevated temperatures and pressures.

2. Definitions

The following terms as used in the specification and claims, are defined as follows:

1. Last. A foot-shaped form on which the parts of a shoe are assembled to make a shoe.
2. Upper. The part of a shoe that encases the foot.
3. Outsole. The bottom part of a shoe that makes contact with the ground.
4. Midsole. A cushioning material between the upper and the outsole.
5. Insole. A pad, often removable, on which the foot rests inside the shoe. It is sometimes called the sock liner or the footbed.
6. Sport Shoe. Casual footwear that is generally constructed with a rubber sole bonded, as opposed to sewn, to a cloth (canvas), rubber or leather upper. Examples of casual footwear include slip-ons and sneakers and tennis, basketball, running and deck shoes.
7. Low Density Foam. A foam having a density less than 0.3 g/cc.
8. Compression Set. A measure of a rubbery compound's retention of its elastic properties expressed as the ratio of the loss in thickness to the original thickness of a specimen that is compressed under constant load or constant deflection for a defined period of time at a defined temperature. The values for compression set as given in this specification and claims are based upon ASTM D-3574, test D, constant deflection compression set test using a 50% deflection at 140° C for one and one half hours.
9. One Shot Molding. A method for making polyurethanes in desired sizes and shapes by reacting a polyol blend and an isocyanate in situ in a mold. It differs from two step methods in which a prepolymer is first prepared.
10. Cold Cure. A molding method in which the mold temperature does not exceed about 60° C.
11. Isocyanate Index. The NCO equivalent divided by the reactive hydrogen equivalent.
12. Polymer Polyol. A composition produced by polymerizing one or more olefinically unsaturated monomers dissolved or dispersed in a polyol in the presence of a free radical catalyst as more fully disclosed, for example, in U.S. Pat. No. 4,208,314 incorporated herein by reference.
13. Vulcanization. A term used in the shoe industry to describe a method of bonding the various components of a sport shoe together by subjecting the components to elevated temperatures and pressures as they are assembled around a last. The term as so used in the shoe industry may or may not accurately reflect the ordinary meaning of vulcanization as used and understood in the rubber industry.

3. Description of the Prior Art

This invention relates to one shot molded polyurethane foamed parts that are suitable for use as components for sport shoe. In the ordinary construction of a sport shoe, there may be included between the outer sole and the upper a number of components such as, for example, innersoles, midsole, and arch supporters. One shot molded foam polyurethanes are well suited materials from which to make these intermediate parts because of a number of desirable properties including flexibility, resilience and low density. The polyurethanes are also useful because they can be formulated to be soft to the touch and comfortable to the foot.

In one method of making sport shoes, the components of the shoe are bonded together with adhesives. By another method of construction, referred to in the trade as vulcanization, the components of the shoe are heated to vulcanization temperatures and the rubber components are cohered, under pressure, to each other. Typically, the vulcanization process is conducted at a temperature of about 140° C. for a period of about one and a half hours. As a general rule, the vulcanization method is preferred to the use of adhesives because it is simpler and cheaper. Vulcanization is also superior to adhesive bonding in that the shoe is more durable and can be washed, for example, in hot detergents without any concern of dissolving or softening an adhesive. One drawback of the vulcanization procedure is, however, that components such as midsoles, insoles and arch supporters cannot be molded from polyurethanes since the one shot, low density, foamed polyurethanes known to the prior art cannot survive vulcanizing temperatures and pressures without a substantial diminution in some of their desired physical properties. Arbitrarily the sport shoe industry has established the criteria that if the components of a sports shoe made by vulcanizing are to be useful, they should have a compression set of less than 20% and, for some applications, also should pass a bend test in which the polyurethane foam is heated in a 140° C. oven for one hour and a half and doubled back on itself (180° bend) without breaking immediately after it is taken out of the oven.

One process for making polyurethanes with a better high temperature property of modulus of torsional elasticity is disclosed in U.S. Pat. No. 4,698,410. This patent makes use of certain urea derivatives reacted with conventional isocyanates and polyols to achieve better high temperature properties and is concerned with dense or foamed polyurethanes with densities above 0.3 g/cc.

It is also known that polyurethanes with improved resistance to thermal degradation can be obtained if polyester polyols are used rather than polyether polyols. However, because polyester polyols are significantly more expensive than polyether polyols and for other reasons, it is preferred to use polyether polyols in making components for sport shoes.

SUMMARY OF THE INVENTION

Accordingly, it is an object of this invention to provide low density polyurethane foams that display improved resistance to physical degradation at elevated temperatures and pressures.

Another object of this invention is to provide polyurethane foams that remain both flexible and resilient after exposure to temperatures of about 140°.

Another object of this invention is to prepare low density foamed polyurethanes from polyether polyols with improved resistance to elevated temperatures.

A further object of this invention is to provide a method for making components of sport shoes from one shot molded low density polyurethanes that substantially maintain desired physical properties under shoe vulcanizing conditions.

These and other objects of this invention are achieved by preparing the polyurethanes from a blend of high molecular weight polyols, catalysts, blowing agents, pigments, stabilizers and the like, and reacting the blend with a polymeric diphenylmethane isocyanate characterized in that: the polyols are a mixture of a high molecular weight polyether polyol and a polymer polyol; the polymeric diphenylmethane isocyanate has a functionality of between about 2.3 and 2.7; the isocyanate index is about 1; and the catalysts are a mixture of metal and amine catalysts.

In order to maintain desired properties after exposure to elevated temperatures and pressures, it is necessary to use an isocyanate with a functionality of 2.3 to about 2.7. If the functionality is greater, the molded article will be too rigid and if lower, the resistance to elevated temperatures and pressures will be sacrificed.

The selection of the polyol is also important in obtaining the desired temperature and pressure resistance. It has been found that the use of a blend of polyols, including a high molecular weight polyol and polymer polyol, is necessary. Modifications in the properties within the scope of this invention are obtained by using either diols or triols as the polyol component of either the high molecular weight polyol or the polymer polyol, provided however, that at least one of the polyols should be a triol. If both polyols are triols, the molded polyurethane will maintain good compression set properties after exposures to shoe vulcanization conditions but may be too stiff to pass the 180° bend test. The ability to pass the 180° bend test may or not be important depending upon the shoe component that is being made.

It is also important in the practice of this invention to use a mixed catalyst system including a minor amount, less than 10% by weight, of a metal catalyst and a major portion, more than 90% by weight, of an amine catalyst. The combination of the two catalysts provide for the desired reactivity of the system and the stiffness of the molded article.

EXAMPLE

A Procedure

The open-celled low density foams of the present invention are formed by the reaction of a blend of polyols, catalysts, cross-linkers, blowing-agents, fillers, pigments, stabilizers and the like, with a polyisocyanate at an isocyanate index of about 1. The polyols are a mixture of a high molecular weight polyether polyol having a molecular weight between about 5,000 and 7,000 and a polymer polyol. The isocyanate is a polymeric aromatic isocyanate based upon diphenylmethane diisocyanate having a functionality of between about 2.3 and 2.7. In the preferred embodiments of this example, the high molecular weight polyol is a triol and the polymer polyol is a diol. In any case, at least one of the polyols should be a triol.

The blend of the polyols, catalysts, cross linking agents, blowing agents, fillers, pigments, stabilizers, etc. is mechanically mixed at room temperature. Following thorough mixing, the isocyanate is added to the polyol blend, mixed together and poured into an open mold preheated to 50°-60° C. The mold is then closed and the resultant foamed polyurethane is allowed to cure for 6-10 minutes. After this low temperature cure, a foamed product is demolded. The mechanical properties were measured three to five days after demolding.

The shot size, or quantity of reactants charged into the mold, may be stated as a percentage of the volume of space available which the polyurethane foam must fill. As is known, the density and hardness of a molded article will vary with the shot size and a larger shot size will yield a denser, harder article than will a smaller shot size.

| B. | The Reactive Mixture. | Grams |
|---|---|---|
| | THANOL DP-1373 (6000 MW Triol) | 60 |
| | NIAX 24-32 (Diol Polymer Polyol) | 40 |
| | WATER | 1.0 |
| | FOMREZ UL-1 (Catalyst) | 0.01 |
| | DABCO 33-LV (Catalyst) | 0.4 |
| | DABCO 8154 (Catalyst) | 0.2 |
| | L-5309 (Surfactant) | 1.0 |
| | F-11 (Blowing Agent) | 1.0 |
| | PAPI - 94 (Polymeric Isocyanate) | 21.9 |
| | | (Index = 1) |

C. Definitions of the Reactants

THANOL DP-1373 Polyol (Arco Chemical). A 6,000 molecular weight triol.

NIAX 24-32 Polymer Polyol (Union Carbide). A polymer polyol which is a capped primary hydroxol diol. The molecular weight of the base polyol is 2800, it has an hydroxol number of 3 and it contains about 10% by weight each of acrylonitrile and styrene.

FOMREZ UL-1 Catalyst (Witco Chemical Corporation Organics Division). A dibutyltin sulfide dissolved in a plasticizer.

DABCO 33LV Catalyst (Air Products & Chemicals). A clear, colorless, nonaqueous solution containing one part by weight DABCO (a crystalline triethylenediamine, a high-purity tertiary amine) and two parts dipropylene glycol.

DABCO 8154 Catalyst (Air Products & Chemicals). A chemically (amine) blocked delayed action catalyst used to delay cream time.

L-5309 Surfactant (Union Carbide Corporation). A polyoxyethylene-polysiloxane surfactant having a specific gravity of 1.00 and a viscosity of 225 cps at 25 degrees Celcius.

FREON 11 Blowing Agent (Dupont). Fluorotrichloromethane.

PAPI 94 Isocyanate (Dow Chemical Corporation). A polymeric MDI product derived from the reaction of carbonylchloride with an aniline-formaldehyde condensate. It has a functionality of 2.3, an isocyanate equivalent of 131 and an NCO content of 32% by weight.

D. Results

A polyurethane foam made in accordance with the above procedure was found to have a density of 0.28 g/cc, a hardness of 55-60 Shore (00) and a ball rebound resiliency of 58-62%. The compression set measured as defined above was 5.9%. The compression set was again measured at 70° C. for 22 hours and at room temperature for 72 hours and found to be 3.2% and 2.0% respectively. These amounts of compression set are acceptable to the shoe industry for use as components in sport shoes of vulcanized construction.

Additional samples of the foamed polyurethane were heated in an 140° C. oven for one and one half hours and then bent 180° immediately after they were removed. The samples survived the bend test without breaking or cracking.

The linear shrinkage at 160° for one hour of polyurethanes made as above-described was measured to be less than 0.5% and the high temperature sag was 0.12 inches (as determined by ASTM D-3769 with a 4 inch overhang at 120° C. for one hour).

We claim:

1. A method for the one shot molding of a polyurethane foam that has a bulk density of less than about 0.3 grams per cubic centimeter and maintains a low compression set after exposure to elevated temperatures and pressures, which method comprises
   a. forming a reactive blend of
      i. at least one high molecular weight polyether polyol,
      ii. at least one polymer polyol,
      iii. a catalyst blend comprising a major amount by weight of an amine catalyst and a minor amount by weight of a metal catalyst and
      iv. at least one blowing agent and
   b. reacting the reactive blend with a polymeric diphenylmethane isocyanate having a functionality from about 2.3 to about 2.7 and an isocyanate index of about 1.

2. A method according to claim 1 wherein the high molecular weight polyether polyol has a polyol component that is either a diol or a triol.

3. A method according to claim 1 wherein the polyol polyol has a polyol component that is either a diol or a triol.

4. A method according to claim 1 wherein the polyol mixture is comprised of a major portion of a high molecular weight polyether triol and a minor portion of a diol polymer polyol.

5. A method according to claim 1 wherein the polyol mixture comprises about 60% of a polyether triol and about 40% of a diol polymer polyol.

6. A method according to claim 1 wherein the high molecular weight polyether polyol has a molecular weight of at least about 5,000.

7. A method according to claim 1 wherein the polyol mixture is comprised of a major portion of a high molecular weight polyether triol and a minor portion of a diol polymer polyol and the high molecular weight polyether polyol has a molecular weight of at least about 5,000.

8. A method according to claim 1 wherein the catalyst blend comprises at least about 90% by weight of the blend of an amine catalyst and not greater than about 10% by weight of the blend of a metal catalyst.

9. A method according to claim 1 wherein the polyol mixture is comprised of a major portion of a high molecular weight polyether triol and a minor portion of a diol polymer polyol, the high molecular weight polyether polyol has a molecular weight of at least about 5,000 and the catalyst blend comprises at least about 90% by weight of the blend of an amine catalyst and not greater than about 10% by weight of the bend of a metal catalyst.

10. A molded polyurethane component made in accordance with the method of claim 1.

11. A molded polyurethane component according to claim 9 wherein the compression set of the molded polyurethane component is less than 10%.

12. A molded polyurethane component according to claim 9 wherein the molded polyurethane component does not break when bent 180° immediately after it has been heated in an oven to 140° C. for one and one half hours.

13. A polyurethane foam composition that has a bulk density of less than about 0.3 grams per cubic centimeter which composition comprises the reaction product of
   a. at least one high molecular weight polyether polyol,
   b. at least one polymer polyol,
   c. a catalyst blend comprising a major amount by weight of an amine catalyst and a minor amount by weight of a metal catalyst,
   d. at least one blowing agent and
   e. a polymeric diphenylmethane isocyanate having a functionality from about 2.3 to about 2.7 and an isocyanate index of about 1
under urethane forming reaction conditions.

14. A composition according to claim 13 wherein the high molecular weight polyether polyol has a polyol component that is either a diol or a triol.

15. A composition according to claim 13 wherein the polymer polyol has a polyol component that is either a diol or a triol.

16. A composition according to claim 13 wherein the polyol mixture is comprised of a major portion of a high molecular weight polyether triol and a minor portion of a diol polymer polyol.

17. A composition according to claim 13 wherein the polyol mixture comprises about 60% of a polyether triol and about 40% of a diol polymer polyol.

18. A composition according to claim 13 wherein the high molecular weight polyether polyol has a molecular weight of at least about 5,000.

19. A composition according to claim 13 wherein the polyol mixture is comprised of a major portion of a high molecular weight polyether triol and a minor portion of a diol polymer polyol and the high molecular weight polyether polyol has a molecular weight of at least about 5,000.

20. A composition according to claim 13 wherein the catalyst blend comprises at least about 90% by weight of the blend of an amine catalyst and not greater than about 10% by weight of the blend of a metal catalyst.

21. A composition according to claim 13 wherein the polyol mixture is comprised of a major portion of a high molecular weight polyether triol and a minor portion of a diol polymer polyol, the high molecular weight polyether polyol has a molecular weight of at least about 5,000 and the catalyst blend comprises at least about 90% by weight of the blend of an amine catalyst and not greater than about 10% by weight of the blend of a metal catalyst.

22. A composition according to claim 13 wherein the compression set of the composition is less than 10%.

23. A composition according to claim 25 wherein composition component does not break when bent 180° immediately after it has been heated in an oven to 140° C. for one and one half hours.

24. A method of making a polyurethane foam composition that has a bulk density of less than about 0.3 grams per cubic centimeter which method comprises
   a. forming a reactive blend of
      i. at least one high molecular weight polyether polyol,
      ii. at least one polymer polyol,
      iii. a catalyst blend comprising a major amount by weight of an amine catalyst and a minor amount by weight of a metal catalyst and
      iv. at least one blowing agent and
   b. reacting the reactive blend with a polymeric diphenylmethane isocyanate having a functionality from about 2.3 to about 2.7 and an isocyanate index of about 1.

25. A method according to claim 26 wherein the high molecular weight polyether polyol has a polyol component that is either a diol or a triol.

26. A method according to claim 26 wherein the polymer polyol has a polyol component that is either a diol or a triol.

27. A method according to claim 26 wherein the polyol mixture is comprised of a major portion of a high molecular weight polyether triol and a minor portion of a diol polymer polyol.

28. A method according to claim 26 wherein the polyol mixture comprises about 60% of a polyether triol and about 40% of a diol polymer polyol.

29. A method according to claim 26 wherein the high molecular weight polyether polyol has a molecular weight of at least about 5,000.

30. A method according to claim 26 wherein the polyol mixture is comprised of a major portion of a high molecular weight polyether triol and a minor portion of a diol polymer polyol and the high molecular weight polyether polyol has a molecular weight of at least about 5,000.

31. A method according to claim 26 wherein the catalyst blend comprises at least about 90% by weight of the blend of an amine catalyst and not greater than about 10% by weight of the blend of a metal catalyst.

32. A method according to claim 26 wherein the high molecular weight polyether polyol has a molecular weight of at least about 5,000 and the catalyst blend comprises at least about 90% by weight of the blend of an amine catalyst and not greater than about 10% by weight of the blend of a metal catalyst.

33. A molded polyurethane component made in accordance with the method of claim 26.

34. A molded polyurethane component according to claim 9 wherein the compression set of the molded polyurethane component is less than 10%.

35. A molded polyurethane component according to claim 9 wherein the molded polyurethane component does not break when bent 180° immediately after it has been heated in an oven to 140° C. for one and one half hours.

36. A vulcanized polyurethane composition that comprises the vulcanization product of a polyurethane composition that has a bulk density of less than about 0.3 grams per cubic centimeter and comprises the reaction product of
 a. at least one high molecular weight polyether polyol,
 b. at least one polymer polyol,
 c. a catalyst blend comprising a major amount by weight of an amine catalyst and a minor amount by weight of a metal catalyst,
 d. at least one blowing agent and
 e. a polymeric diphenylmethane isocyanate having a functionality from about 2.3 to about 2.7 and an isocyanate index of about 1
under urethane forming reaction conditions.

* * * * *